Figure 1:
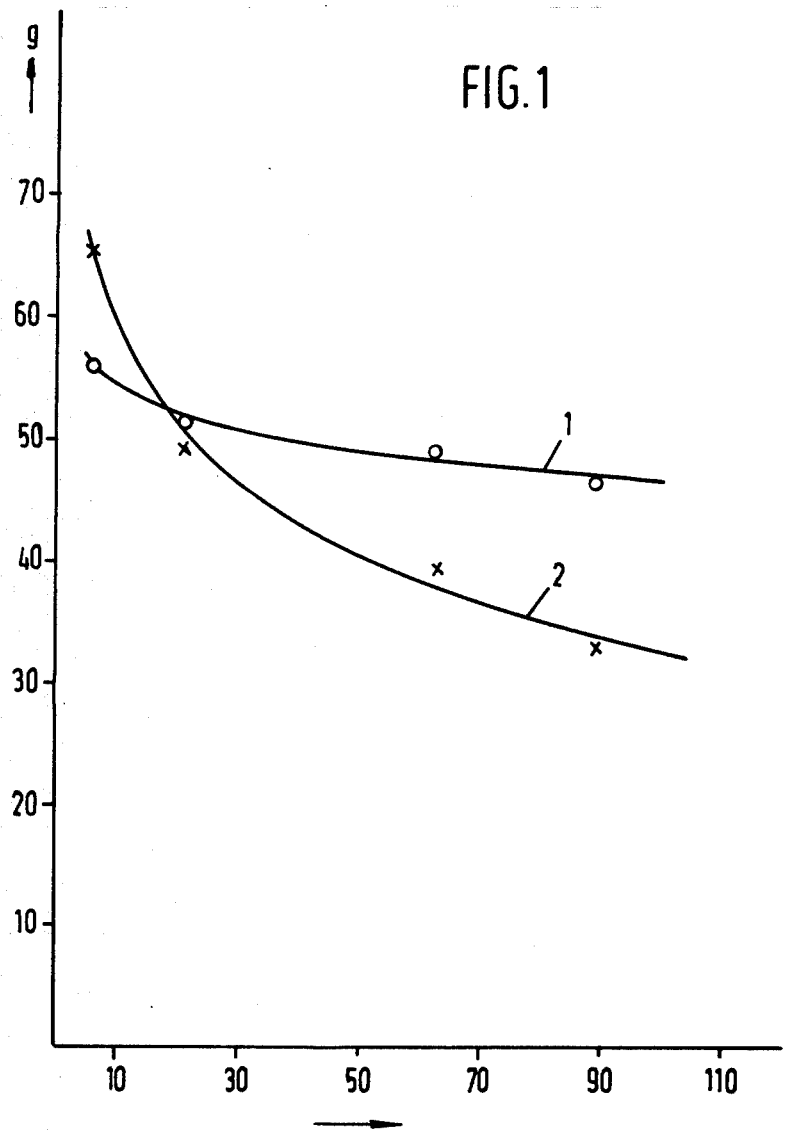

United States Patent [19]

Noomen

[11] Patent Number: 4,550,858
[45] Date of Patent: Nov. 5, 1985

[54] TIMED-DISPENSING METHOD AND APPARATUS

[75] Inventor: Pieter J. Noomen, Utrecht, Netherlands

[73] Assignee: Dowe Egberts Koninklijke Tabaksfabrier Koffiebranderijen Theehandel N.V., Utrecht, Netherlands

[21] Appl. No.: 452,861

[22] Filed: Dec. 23, 1982

[30] Foreign Application Priority Data

Dec. 31, 1981 [NL] Netherlands .......................... 8105936

[51] Int. Cl.$^4$ ............................................... B67D 5/42
[52] U.S. Cl. ........................................ 222/1; 222/639
[58] Field of Search ............... 222/638, 639, 640, 641, 222/333, 394, 400, 5, 504, 1, 501, 503, 509; 251/139, 141, 65; 239/99, 585

[56] References Cited

U.S. PATENT DOCUMENTS

| | | | |
|---|---|---|---|
| 2,526,735 | 10/1950 | Duce | 222/510 X |
| 3,258,166 | 6/1966 | Kückens | 222/504 X |
| 3,343,721 | 9/1967 | Paley | 222/641 |
| 4,203,554 | 5/1980 | Zimmer et al. | 239/585 |
| 4,487,333 | 12/1984 | Pounder et al. | 222/54 |

FOREIGN PATENT DOCUMENTS

| | | |
|---|---|---|
| 2317805 | 10/1974 | Fed. Rep. of Germany . |
| 2614782 | 6/1977 | Fed. Rep. of Germany . |
| 1428762 | 1/1966 | France . |
| 1309775 | 3/1973 | United Kingdom . |
| 1591803 | 6/1981 | United Kingdom . |

Primary Examiner—Joseph J. Rolla
Assistant Examiner—Michael S. Huppert
Attorney, Agent, or Firm—Cushman, Darby & Cushman

[57] ABSTRACT

Method and apparatus for dispensing a consumption unit of beverage concentrate having a pre-determined volume, in particular a beverage concentrate of high and variable viscosity, in a beverage dispensing machine. A system is described in which for each quantity dispensed a valve is opened for a specific period of time and the concentrate issues from a reservoir into a cup or the like under a constant static pressure. The invention aims to improve uniformity in quantities dispensed, which is accomplished by dispensing each consumption unit in a pulsating manner.

4 Claims, 4 Drawing Figures

TIMED-DISPENSING METHOD AND APPARATUS

For the dispensing of beverage concentrates in beverage vending machines, various systems are known. One of these, which is in general use, makes use of so-called timed dispensing. In this system a valve is opened for a specific period of time, with the beverage concentrate issuing under a constant static pressure. In this system use is made of the Mariotte bottle principle. Reference is made to U.S. Pat. No. 3,258,166.

Timed dispensing as carried out in this manner, however, has its disadvantages. These occur, in particular, with concentrates of variable viscosity, such as coffee and tea concentrates. The variability may manifest itself in various ways. Concentrates made in slightly different ways, or from slightlydifferent starting materials, may differ in viscosity. Furthermore, the viscosity may depend on the temperature and on the age of the concentrate. The variability may also manifest itself in a non-homogeneous composition of the liquid, to the extent of local "lump formation", so that the microviscosity has a different value from place to place. It is especially in coffee concentrate that this phenomenon may occur.

The result of all this is that in a given period of time the quantities being dispensed are not always equal. This applies in particular if lumps have formed in the concentrate, whereby the outlet opening may become clogged to a greater or lesser extent, which may give rise to incorrect quantities being dispensed.

It has now been found that in the timed-dispensing system a considerable improvement is reached by alternately opening and closing the valve a number of times during the dispensing of each unit quantity.

The present invention accordingly provides a method of dispensing a consumption unit of beverage concentrate having a pre-determined volume, in particular a beverage concentrate of high and variable viscosity, in a beverage dispensing machine, in which, for each quantity dispensed, a valve is open for a specific period of time and the beverage concentrate issues under a constant static pressure, characterized in that each consumption unit is dispensed in a pulsating manner.

Generally speaking, the opening of the valve is effected by causing a valve, at least partially of magnetizable material, to be pulled upwards by turning on a magnetic force to clear an outlet opening for the beverage concentrate and, after a certain period of time, allowing the valve to be lowered again by gravity by turning off such magnetic force. It is especially the velocity at which this latter takes place which depends on the visicosity. The number of times per second the valve is opened and closed again is partly limited by this. It is also possible, however, to have the valve closed magnetically, too, for example by using two electromagnets, or one electromagnet for pulling it upwards and a permanent magnet for pulling it downwards. Preferred frequencies in both cases are 8–20. Pulling upwards, for example, may take 10 milliseconds- and lowering by gravity 100 milliseconds; using two magnets, lowering in such a case may also be limited to 10 milliseconds.

In addition to the viscosity, the time needed for the valve to be lowered again naturally also depends on the dimensions of the dispensing device and, quite generally, on the overall configuration.

One determinative factor for the minimum number of times per second that the valve must be opened and closed is the velocity at which it is desired to dispense a consumption unit of beverage concentrate. Consumption unit of beverage concentrate, as used in this context, means a quantity of beverage concentrate needed for a consumption unit of beverage that is ready for use. This latter may correspond to a cap, mug, bowl or glass, and normally ranges between 50 and 200 $cm^3$.

In addition to the number of times per second that the valve must be opened and closed, a factor of interest is the number of times this must be done per consumption unit. This of course depends on the accuracy with which it is desired to dispense a particular quantity. Generally speaking, the valve will be required to be opened and closed at least 5 times and preferably 8–20 times per second, and also at least 5 times and preferably 8–20 per consumption unit.

The pulses may be given directly one after the other. It is also possible to have a shorter or longer interval between the individual pulses. This is useful, in particular if the addition of the water required to the concentrate to make the ready beverage takes more time than the addition of the concentrate. This would involve non-uniform mixing. The pulses may then be distributed so that the addition of concentrate and the addition of water begin and end practically simultaneously. In the case of coffee dispensing machines, for example, operating with coffee concentrate, this also gives a more pleasant visual image for the user.

The quantity of beverage concentrate to be dispensed per consumption unit can be controlled either by varying the number of pulses or by regulating the duration of the pulses while maintaining a constant number of pulses. Naturally it is also possible to give the pulses in "blocks" of a certain number with a somewhat longer interval between the blocks. All controls as referred to above are possible by methods well-known in electronics, for example, by energizing an electromagnet in response to a signal (e.g. pushing a button, or inserting a coin) by an electronic control unit with microprocessor.

The present invention also provides a dispensing device for dispensing a desired quantity of beverage concentrate, in particular a beverage concentrate of high and variable viscosity, in a beverage dispensing machine in which a valve is opened for a specific period of time and the beverage concentrate issues under a constant static pressure, comprising a housing connected to a reservoir for the beverage concentrate provided in said beverage dispensing machine, through which housing, in use, said beverage concentrate flows when said valve is opened, said housing having an outlet opening for the beverage concentrate which, in the operative position, is located at the lowest point thereof, and being provided with a valve member movable in the vertical direction under magnetic forces for closing said outlet opening, characterized in that said outlet opening is formed by the bore of a valve seat co-operating with a choke body forming part of said valve member, said choke body comprising a choke tip sealingly fitting said valve seat, and guide means, freely passable to the beverage concentrate, for fixing the valve member in horizontal direction by sliding support against the inner surface of the housing, the arrangement being such that when the outlet opening is closed by the choke tip practically no beverage concentrate is retained in or under the valve seat.

The resiliency and hardness of the materials which in the closed position of the valve are in contact with each other must preferably be attuned to each other in such a manner that there is a contacting surface, but that this is of such limited size that the opening of the valve only requires overcoming minor "sticking" forces. By sticking forces are understood the adhesive forces between the two surfaces by beverage concentrate present between them.

In a preferred embodiment of the invention, the seat is made of a resilient, dimensionally stable material, and the choke tip of hard non-resilient material, for example, metal. In another preferred embodiment, conversely, the seat is of hard, non-resilient material and the choke tip of resilient, dimensionally stable material.

Dimensionally stable, as used in this context, is the property of the material of, after deformation, accurately resuming the same shape as before the deformation. Highly suitable materials have been found to be rubber and other elastomers having a Shore A hardness of between 30° and 90°, preferably between 70° and 80°.

The most preferred embodiment is one in which the outlet opening is circular and the choke tip has the shape of a segment of a sphere. In that embodiment the choke tip will always accurately fit the seat even in the case of—naturally always very small—deviations of the valve member from the vertical position. The radius of the sphere segment preferably ranges between 1.05 and 12 times the radius of the circular outlet opening and suitably between 1.3 and 4.0 times. For coffee concentrate, the radius of the outlet opening preferably ranges between 1.5 and 4.5 mm. Highly suitable has been found to be a radius of 2–3 mm.

It is of interest to choose the configuration of seat and choke tip so that after the closure of the outlet opening, no liquid is exposed to the outer air. Otherwise it may dry up, naturally with adverse effects to the reproducibility and accuracy. In this connection the seat is preferably a flat ring with a thickness of 0.3–1 mm. Highly suitable has been found to be a thickness of 0.5 mm.

If desired the device may be combined with means for spraying a small quantity of water from below to the closed outlet opening after each quantity dispensed. This may be effected, for example, with a thin water jet. The dispensing device just described is very satisfactory with the pulsating dispensing system, as discussed above, but without pulsation it also has substantial advantages over and above prior timed-dispensing devices. In the pulsating dispensing system, the dispensing device according to the invention is brought into operative association with means for magnetically activating the valve member for opening said valve at a rate within the range of from 5 to 50, and preferably from 8 to 20 times per second.

The method and apparatus according to the invention will be described in more detail hereinafter with reference to the following figures and tables.

FIG. 1 is a graph in which the viscosity dependencies of the quantity of coffee extract dispensed without pulsation are compared for two timed-dispensing devices, namely, that according to the present invention and that described in U.S. Pat. No. 3,258,166.

Table I compares, for a coffee extract having a viscosity of about 15 cP and marked lump formation, the quantities successively dispensed in a series without and with pulsation.

Figure 2:
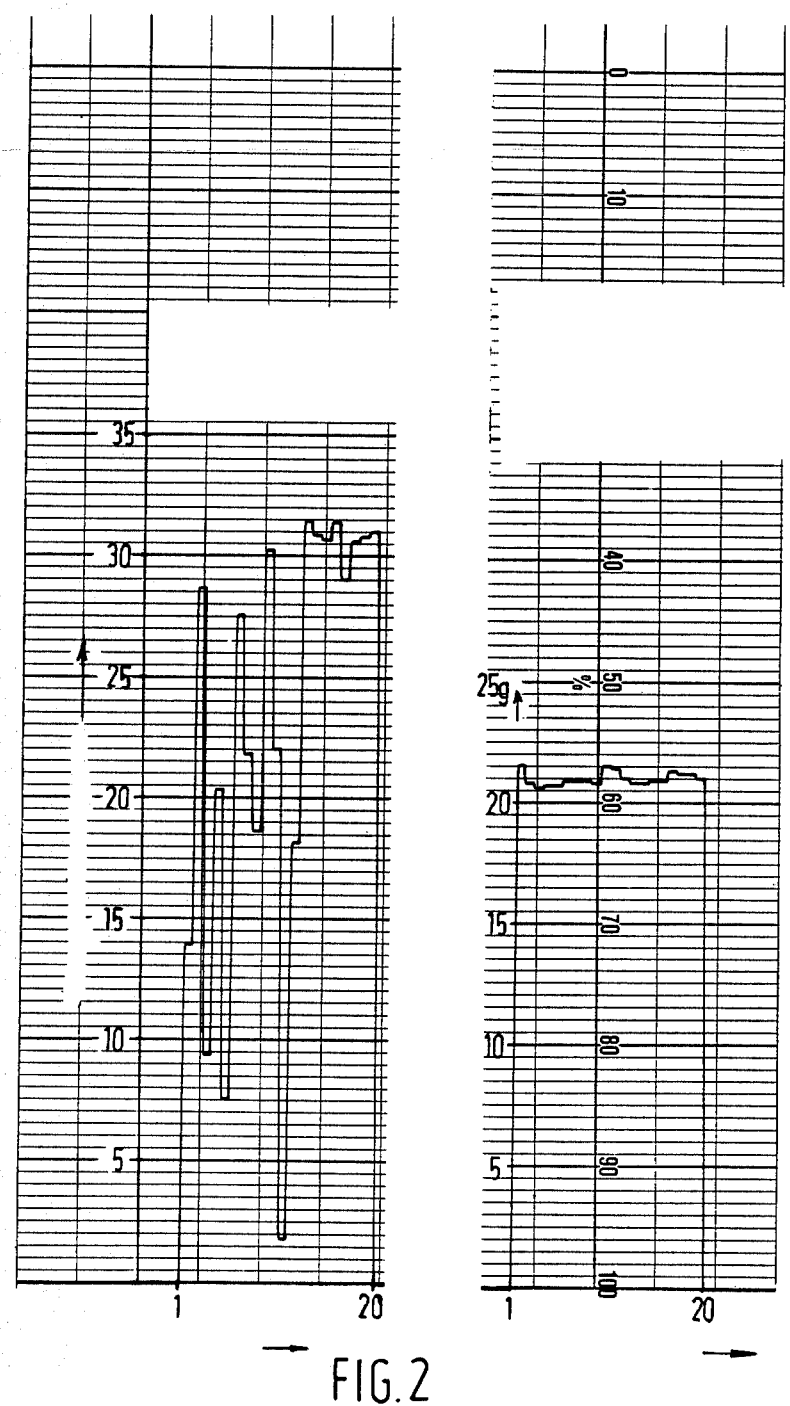

FIG. 2 is a graphic representation of the measurement results of table I;

Table II gives the same comparison as table I, but with dispensing being alternately effected without and with pulsation.

Figure 3:
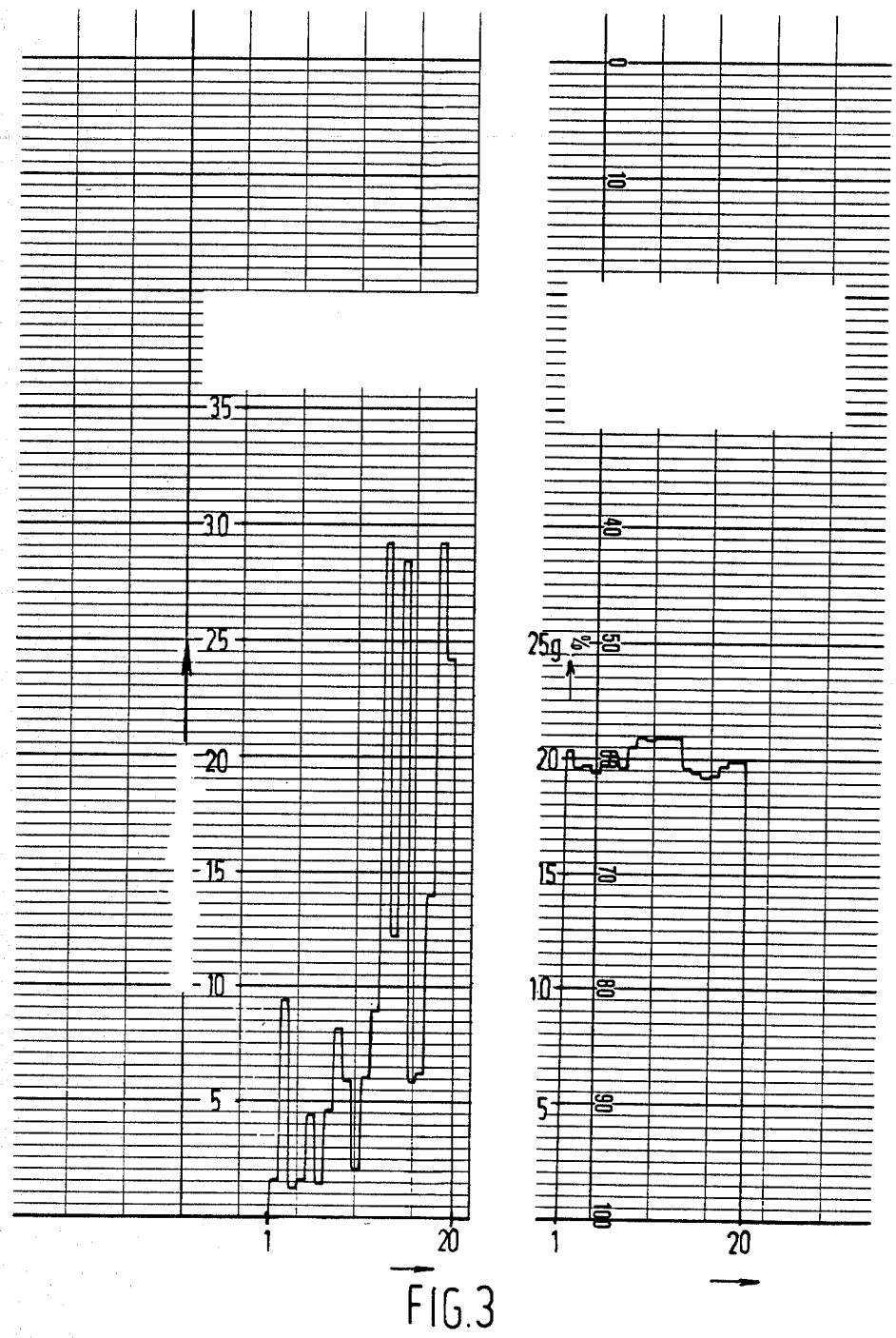

FIG. 3 gives a graphic representation of the measurement results of table II.

Figure 4:
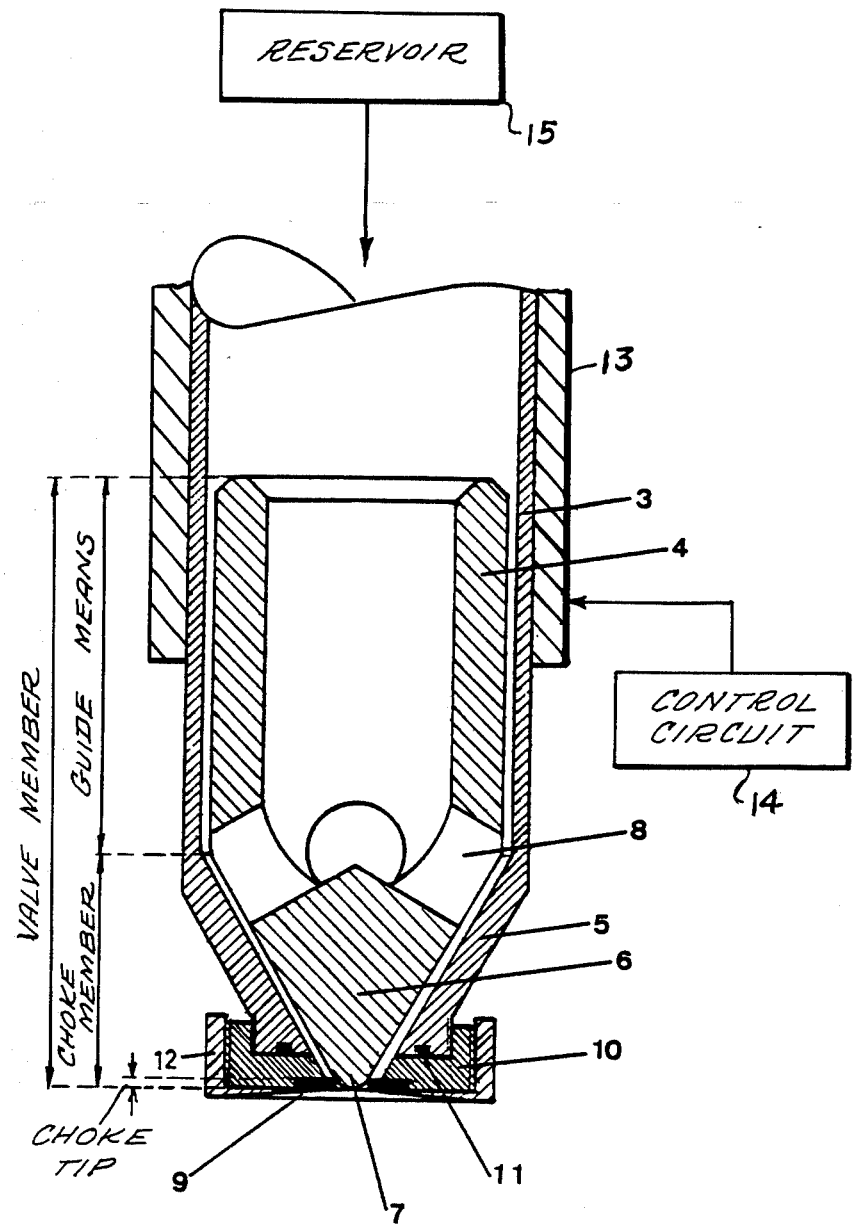

FIG. 4 is a cross-sectional view of one embodiment of the dispensing device according to the invention, with the seat being made of resilient material and the choke tip of metal.

In the comparative tests, the results of which are plotted in the graph of FIG. 1, the quantities of coffee extracts of different viscosities, dispensed without pulsation, were measured. The line designated by 1 indicates the quantity dispensed with the device according to the invention shown in FIG. 4. By 2 is designated the line representing the results using the conventional device described in U.S. Pat. No. 3,258,166. The dispensing time was 1.2 seconds and the dimensions of the two devices were perfectly equal, except for the points of distinction concerning the outlet opening and the choke tip cooperating therewith. It is immediately clear that dispensing with the device according to the invention is much less dependent on differences in viscosity than dispensing with the device of U.S. Pat. No. 3,258,166.

The results shown in Table I and FIG. 2 relate to coffee extract having a dry content of 22.5% and marked lump formation. In one series, 20 units were dispensed without pulsation, and in the other 20 units with pulsation. In the pulsation-mode, pulse frequency was 8 per second, with intervals of 100 milliseconds. Both in the pulsating mode and in the non-pulsating mode, the time of energization of the coil providing for the magnetic activation of the valve member was 10 seconds. The very great differences between the two series are immediately conspicuous: the left-hand graph is without pulsation, and the right-hand one with pulsation.

The results shown in Table II and FIG. 3 follow the same pattern. The only difference is that dispensing was effected alternately in a non-pulsating mode and in a pulsating mode.

In FIG. 4, 3 designates the housing of the dispensing device, 4 the valve member, 5 an outer nose, 6 an inner nose, with a choke tip 7 having the shape of a segment of a sphere, and wall throughbores 8. Liquid concentrate from a reservoir 15 is fed through the passageway defined between outer nose 5 and inner nose 6. Reference numeral 9 designates a flat ring 0.5 mm thick and made of rubber with a shore A hardness of 65°, For the tests summarized in tables I and II and FIGS. 3 and 4, the diameter of the hole in the rubber ring was 2.4 mm. The rubber ring 9 is fixedly connected with a replaceable nipple 10, which is screwed on to housing 3. A gasket 11 provides for complete sealing. Around nipple 10 a second nipple 12 can be screwed. This nipple supports the rubber ring 9 in such a manner as to leave clear an edge of 0.3 mm, that is to say, the hole in nipple 12 is 3.0 mm. Inner nose 6 with tip 7 is pulsed up and down by electromagnet 13 under control of conventional circuit 14.

TABLE I

| Portion no. | Weights dispensed in grammes | |
|---|---|---|
| | dispensed without pulsation | dispensed with pulsation |
| 1 | 14.00 | 21.60 |
| 2 | 28.60 | 20.83 |
| 3 | 9.42 | 20.60 |

TABLE I-continued

| Portion no. | Weights dispensed in grammes | |
|---|---|---|
| | dispensed without pulsation | dispensed with pulsation |
| 4 | 20.41 | 20.74 |
| 5 | 7.59 | 20.78 |
| 6 | 27.56 | 20.92 |
| 7 | 21.82 | 20.98 |
| 8 | 18.53 | 21.02 |
| 9 | 30.22 | 20.84 |
| 10 | 22.00 | 21.59 |
| 11 | 1.73 | 21.42 |
| 12 | 18.12 | 20.92 |
| 13 | 31.30 | 20.75 |
| 14 | 30.75 | 20.86 |
| 15 | 30.60 | 20.93 |
| 16 | 31.21 | 21.00 |
| 17 | 28.97 | 21.36 |
| 18 | 30.60 | 21.28 |
| 19 | 30.70 | 21.18 |
| 20 | 31.03 | 20.90 |

TABLE II

| Portion no. | Weights dispensed in grammes | |
|---|---|---|
| | dispensed without pulsation | dispensed with pulsation |
| 1 | 1.65 | |
| 2 | | 20.40 |
| 3 | 9.30 | |
| 4 | | 19.63 |
| 5 | 1.18 | |
| 6 | | 19.80 |
| 7 | 1.59 | |
| 8 | | 19.36 |
| 9 | 4.34 | |
| 10 | | 19.86 |
| 11 | 1.42 | |
| 12 | | 20.10 |
| 13 | 4.55 | |
| 14 | | 19.65 |
| 15 | 8.15 | |
| 16 | | 20.56 |
| 17 | 5.84 | |
| 18 | | 20.90 |
| 19 | 1.98 | |
| 20 | | 20.78 |
| 21 | 5.29 | |
| 22 | | 20.98 |
| 23 | 8.29 | |

TABLE II-continued

| Portion no. | Weights dispensed in grammes | |
|---|---|---|
| | dispensed without pulsation | dispensed with pulsation |
| 24 | | 21.00 |
| 25 | 29.11 | |
| 26 | | 20.99 |
| 27 | 12.26 | |
| 28 | | 19.51 |
| 29 | 28.34 | |
| 30 | | 19.49 |
| 31 | 5.71 | |
| 32 | | 19.29 |
| 33 | 6.27 | |
| 34 | | 19.43 |
| 35 | 13.97 | |
| 36 | | 19.73 |
| 37 | 29.25 | |
| 38 | | 20.09 |
| 39 | 24.13 | |
| 40 | | 20.07 |

What I claim is:

1. A method of dispensing a consumption unit of liquid beverage concentrate of high and variable viscosity and having a pre-determined volume in a beverage dispensing machine, in which, for each quantity dispensed, a valve is opened for a specific period of time and the beverage concentrate issues under a constant static pressure, characterized in that each consumption unit is dispensed in a pulsating manner at a frequency of at least five pulsations per second by opening and closing said valve a pre-determined number of times to dispense a volume of liquid which is substantially independent of variations in viscosity.

2. A method according to claim 1, characterized in that the valve is opened by magnetic means.

3. A method according to claim 1, characterized in that the valve is opened and closed by magnetic means.

4. A method of dispensing a consumption unit of liquid beverage concentrate of high and variable viscosity and having a pre-determined volume in a beverage dispensing machine, in which, for each quantity dispensed, a valve is opened for a specific period of time and the beverage concentrate issues under a constant static pressure, characterized in that each consumption unit is dispensed in a pulsating manner by opening and closing said valve at least five times to dispense a volume of liquid which is substantially independent of variations in viscosity.

* * * * *